(12) United States Patent
Sato et al.

(10) Patent No.: US 11,184,163 B2
(45) Date of Patent: Nov. 23, 2021

(54) VALUE COMPARISON SERVER, VALUE COMPARISON ENCRYPTION SYSTEM, AND VALUE COMPARISON METHOD

(71) Applicant: HITACHI, LTD., Tokyo (JP)

(72) Inventors: Hisayoshi Sato, Tokyo (JP); Masayuki Yoshino, Tokyo (JP); Ken Naganuma, Tokyo (JP)

(73) Assignee: HITACHI, LTD., Tokyo (JP)

( * ) Notice: Subject to any disclaimer, the term of this patent is extended or adjusted under 35 U.S.C. 154(b) by 316 days.

(21) Appl. No.: 16/412,891

(22) Filed: May 15, 2019

(65) Prior Publication Data

US 2019/0363878 A1 Nov. 28, 2019

(30) Foreign Application Priority Data

May 28, 2018 (JP) .............................. JP2018-101649

(51) Int. Cl.
*H04L 9/08* (2006.01)
*H04L 9/06* (2006.01)
(Continued)

(52) U.S. Cl.
CPC .............. *H04L 9/085* (2013.01); *H04L 9/008* (2013.01); *H04L 9/0618* (2013.01); *H04L 9/0869* (2013.01); *H04L 9/14* (2013.01)

(58) Field of Classification Search
CPC ....... H04L 9/085; H04L 9/008; H04L 9/0618; H04L 9/0869; H04L 9/14
(Continued)

(56) References Cited

U.S. PATENT DOCUMENTS

2013/0216044 A1* 8/2013 Gentry .................... H04L 9/008
 380/277
2013/0318351 A1* 11/2013 Hirano .................. H04L 9/3231
 713/168
(Continued)

FOREIGN PATENT DOCUMENTS

EP 1804416 A1 7/2007
EP 3024169 A1 5/2016

OTHER PUBLICATIONS

Combined Search and Examination Report under Sections 17 and 18(3) dated Oct. 30, 2019 for GB Patent Application No. 1906828.7.
(Continued)

*Primary Examiner* — Jacob Lipman
(74) *Attorney, Agent, or Firm* — Volpe Koenig

(57) ABSTRACT

A value comparison server holds a first secret key and a plurality of tags corresponding to values, each of the plurality of tags is a ciphertext obtained by encrypting each of the values with an additive-homomorphic encryption scheme by using secret keys including the first secret key and a first parameter, a plaintext space has remainder operation with a natural number as modulo in the encryption scheme, and the value comparison server generates a value used for comparing two values corresponding to two tags included in the plurality of tags from the first secret key and the two tags by using the additive homomorphism; and determines which of the two values is greater or equal, on the basis of whether a discrete logarithm of the generated value to the first parameter can be calculated within a value of a predetermined range.

11 Claims, 12 Drawing Sheets

(51) Int. Cl.
  *H04L 9/14* (2006.01)
  *H04L 9/00* (2006.01)
(58) Field of Classification Search
  USPC .......................................................... 380/44
  See application file for complete search history.

(56) References Cited

U.S. PATENT DOCUMENTS

2015/0089243 A1\* 3/2015 Veugen ................... H04L 9/008
  713/190
2020/0184082 A1\* 6/2020 Fu ........................... H04L 9/008

OTHER PUBLICATIONS

Chenette, Nathan, et al., "Practical Order-Revealing Encryption with Limited Leakage," FSE 2016, LNCS 9783, pp. 474-493, 2016.

\* cited by examiner

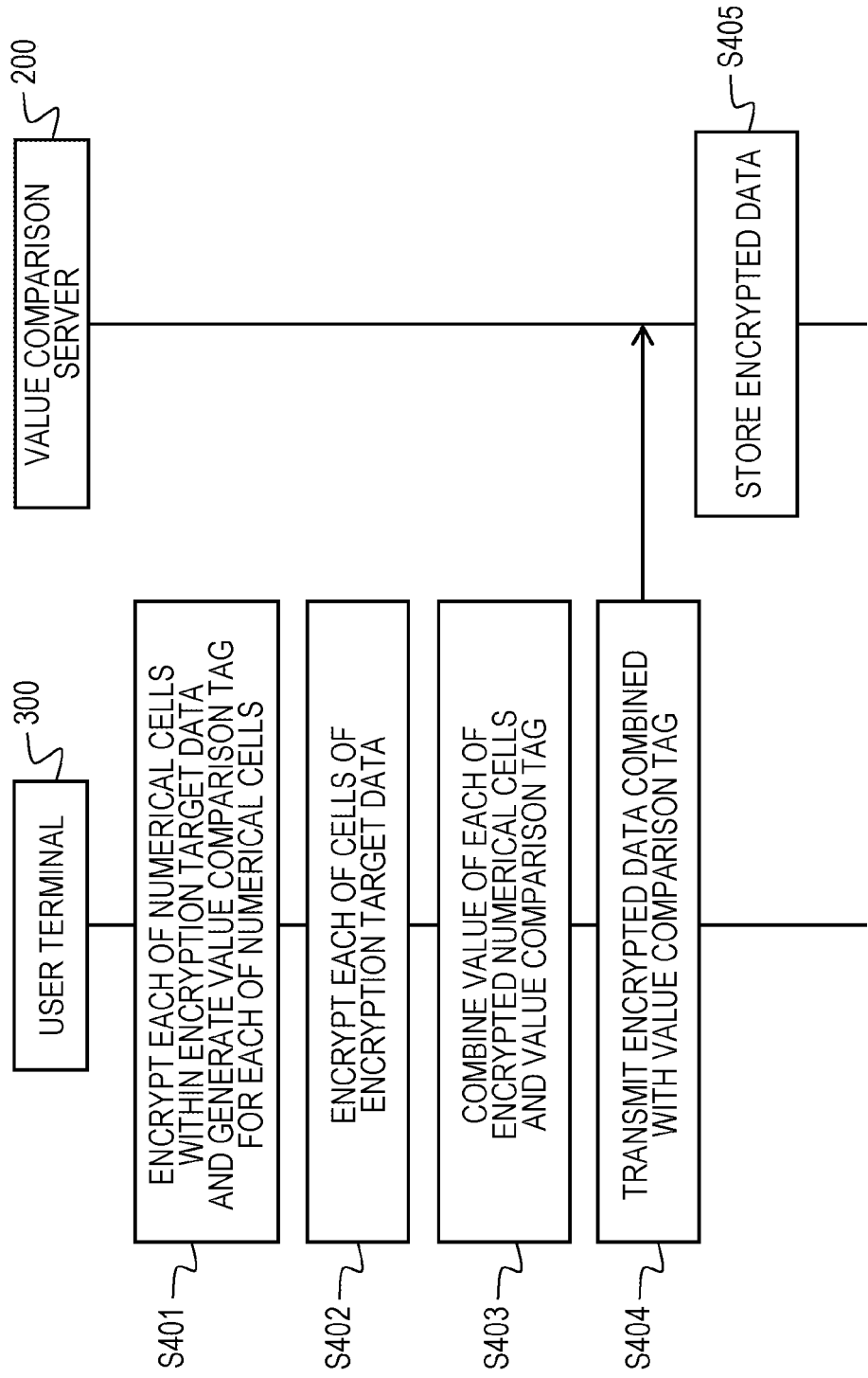

CIPHERTEXT Di: COMBINED

|   | AGE | ADDRESS | OCCUPATION |
|---|---|---|---|
| 1 | D1=C1‖E1 | Enc1(x1) | Enc2(y1) |
| 2 | D2=C2‖E2 | Enc1(x2) | Enc2(y2) |
| 3 | D3=C3‖E3 | Enc1(x3) | Enc2(y3) |

FIG. 8A

| SYSTEM PARAMETERS | |
|---|---|
| G | CYCLIC GROUP HAVING ORDER OF PRIME p |
| g, u | TWO DIFFERENT GENERATORS OF G |
| $h = g^s$ | WHERE, s IS RANDOMLY GENERATED AND SATISFIES $1 < s < p$ |
| U | NATURAL NUMBER |

FIG. 8B

| VALUE COMPARISON TAG GENERATION SECRET KEYS (SECRETLY HELD IN USER TERMINAL) | |
|---|---|
| x | ELEMENT OF CYCLIC GROUP HAVING ORDER OF PRIME p |
| R | RANDOM INTEGER SATISFYING $RT < U$ (WHERE, T IS UPPER LIMIT OF VALUE OF NUMERICAL CELL OF PLAINTEXT) |
| s | RANDOM NATURAL NUMBER (AT TIME OF GENERATION OF SYSTEM PARAMETERS) |

FIG. 8C

| VALUE COMPARISON TAG GENERATION SECRET KEY (SECRETLY HELD IN VALUE COMPARISON SERVER) | |
|---|---|
| s | RANDOM NATURAL NUMBER (AT TIME OF GENERATION OF SYSTEM PARAMETERS) |

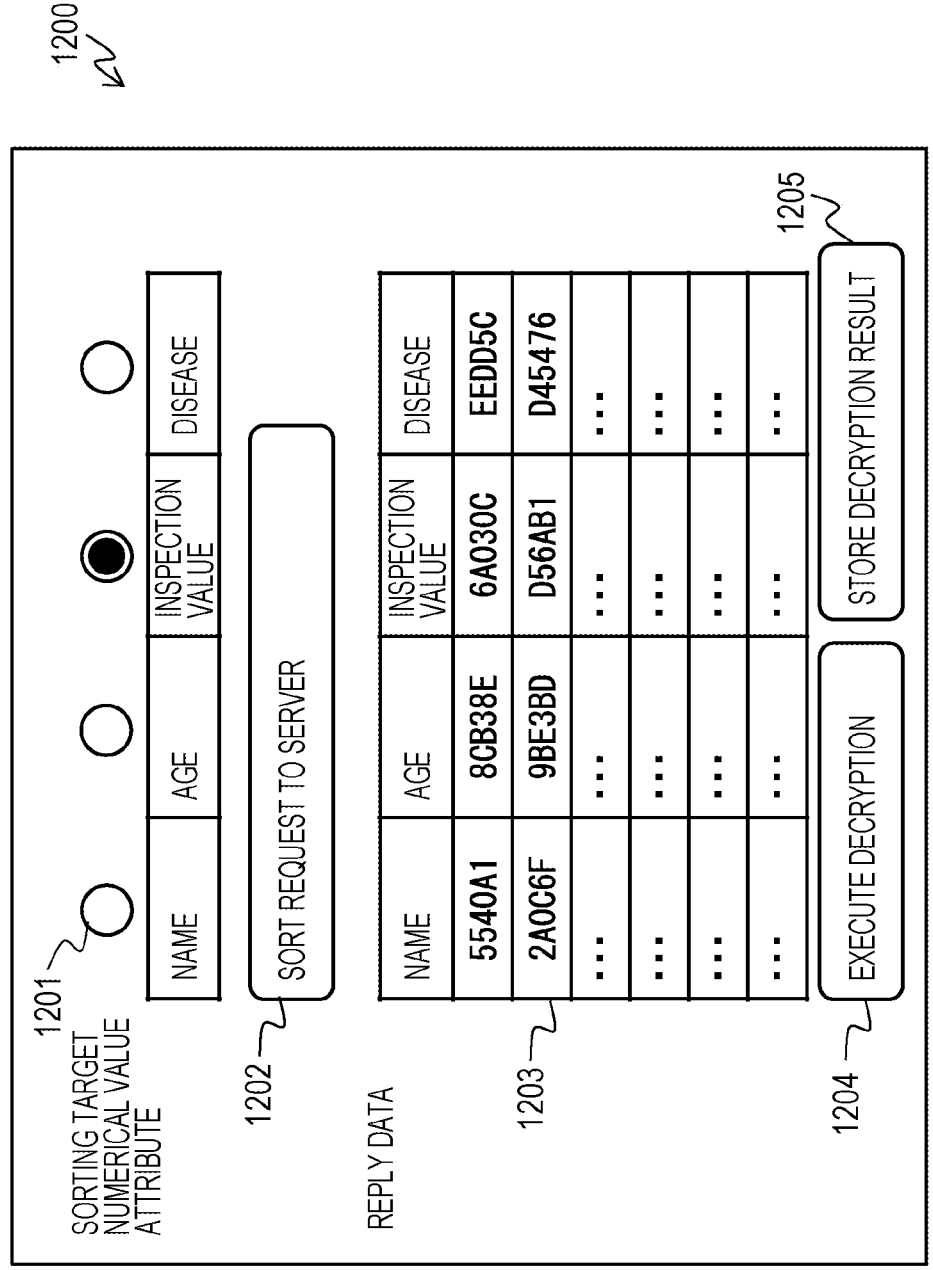

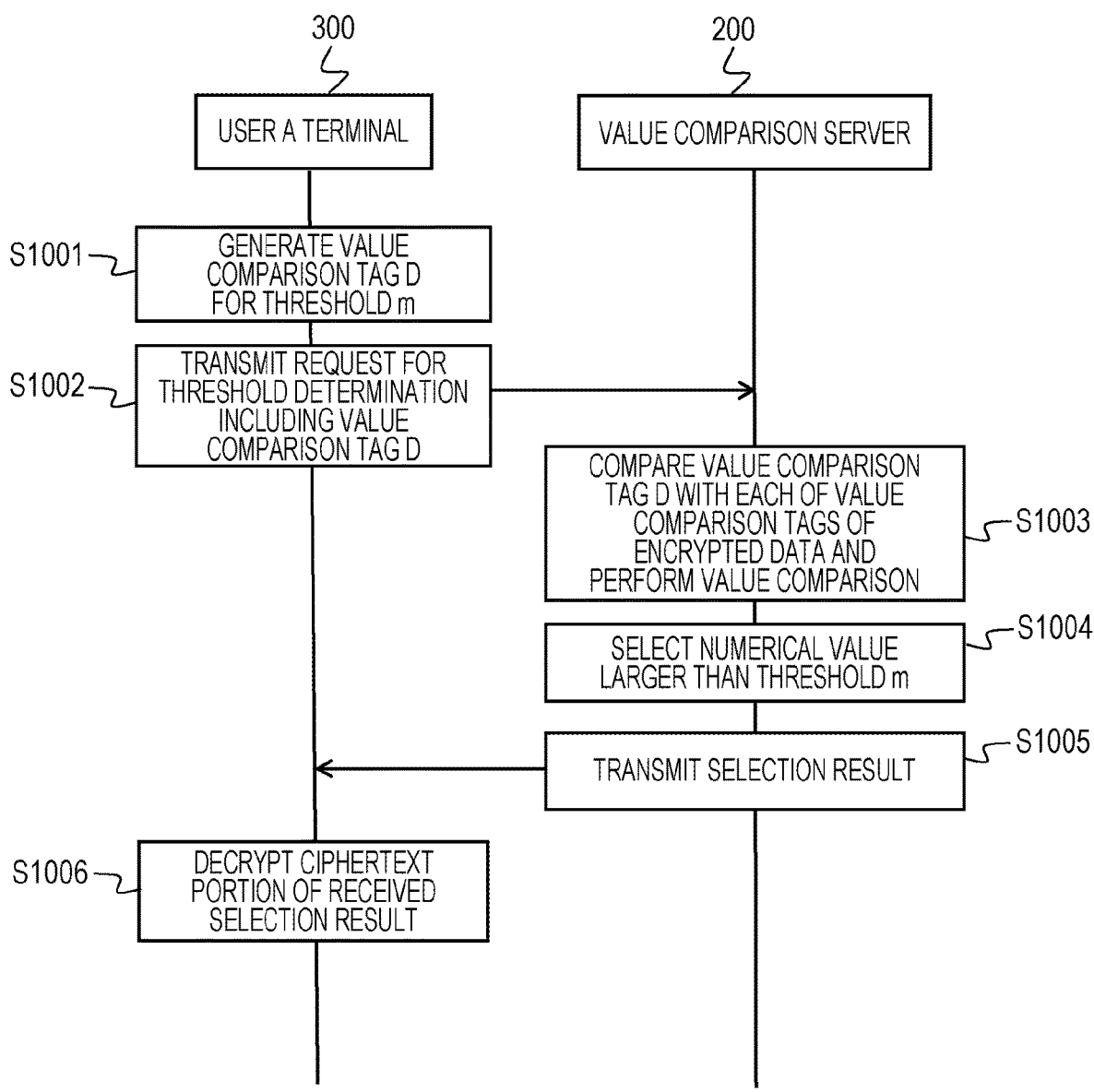

VALUE COMPARISON SERVER, VALUE COMPARISON ENCRYPTION SYSTEM, AND VALUE COMPARISON METHOD

CLAIM OF PRIORITY

The present application claims priority from Japanese patent application JP 2018-101649 filed on May 28, 2018, the content of which is hereby incorporated by reference into this application.

BACKGROUND OF THE INVENTION

1. Field of the Invention

The present invention relates to a value comparison server, a value comparison encryption system, and a value comparison method.

2. Description of the Related Art

In recent years, big data analysis that obtains unknown and effective knowledge from enormous amount of data has been attracting attention. In addition, various forms of analyzing information are increasingly recognized as important activities by companies, executed as collection of external data as well as data owned by the company so as to be utilized for marketing and enhancement of operational efficiency.

Meanwhile, management of stored data has had problems, frequently causing incidents and accidents including leakage of a large amount of information containing customer's personal information, and this has been developed into a social problem. Companies having such leakage accidents would bear a large amount of compensation, leading to a critical issue involving the survival of the company in some cases. Moreover, occurrence of leakage accidents like this would lead to hesitation on individuals being holding information holders in providing their personal information. Therefore, even companies having no relation with the leakage accidents would have difficulty in collecting information, resulting in occurrence of adverse effects of failure in acquisition of effective analysis results.

In response to these circumstances, legislation for correctly collecting and utilizing information has been promoted. Moreover, guidelines on the handling of information in individual industries (in particular, the sophistication of personal information and privacy vary depending on industry) are being developed. However, while these legal aspects and voluntary restrictions have a deterrent effect on information leakage, technical countermeasures against information leakage are also required.

Conventionally, examples of techniques for preventing information leakage and privacy infringement caused by information leakage include access control for restricting persons who can access information and encryption effective for theft of equipment or the like. Unfortunately, however, not a few cases among recent information leakage incidents have been caused by abuse of authority of outsourcing agents who are entrusted with management of computer resources. Since legitimate authority to access a database or the like is given to the administrator, the administrator can browse information unnecessary for original administrative works, and such information might be abused.

For this situation, conventional access control would be ineffective. Even if encryption is used, in a case where information is operated with a scheme in which data is decrypted when the data is retrieved from a storage medium like a storage encryption, the administrator can browse the decrypted data under legitimate procedures.

There is operation in which a decryption key is not placed on the outsourcer or in the vicinity of the outsourcer, and a limited legitimate user in a company has the decryption key, and encryption is performed by obtaining encrypted data at the use of the data. However, in the conventional cryptographic technique, in a case where encrypted data is stored in a database, it would be difficult to execute basic processing such as search and aggregation of numerical data in a state where the data is encrypted. In this case, the database would merely be a ciphertext storage cabinet, and the database function would be wasted.

Recently, attention is focused on research of a technology that enables predetermined processing without decrypting encrypted data while using a highly secure encryption technology. For example, there have been actively conducted researches on searchable encryption capable of determination of matching/non-matching of plaintext without decrypting encrypted data. Still, with searchable encryption targeting ciphertext having a plaintext formed of a character string (name, address, etc.), it would be difficult to execute value comparison processing of numerical data (determining greater-than or equal-to relation between numerical values) and order relation determination processing.

The value comparison processing of the numerical data is an important calculation function that is not merely used for analysis such as data sort processing and data extraction processing by threshold determination processing but also used frequently in normal duties. In a case where the numerical data to be compared is personal information in a medical field or confidential corporate information, disclosing numerical data and assigning processing of the numerical data to a third party including an external cloud or the like would be undesirable from the viewpoint of prevention of information leakage. Therefore, an encryption scheme capable of comparing values while keeping the numerical values in an encrypted state is necessary.

As an encryption scheme capable of comparing values, an encryption scheme referred to as order preserving encryption scheme is known. In the order preserving encryption scheme, value magnitude orders in plaintext are stored in ciphertext as they are. Therefore, anyone who obtained the ciphertext can sort the data.

In other words, leakage of a ciphertext is equivalent to the leakage of plaintext ordinal information. Under specific conditions such as the case where the total number of plaintexts is small, plaintext is predicable from ciphertext, that is, not highly secure. Therefore, Nathan Chenette et al, "Practical Order-Revealing Encryption with Limited Leakage", FSE 2016 Revised Selected Papers of the 23rd International Conference on Fast Software Encryption—Volume 9783, Mar. 20, 2016, Pages 474-493 describes an encryption scheme in which value comparison of encrypted data can be performed only by those having a value comparison secret key.

SUMMARY OF THE INVENTION

However, in the encryption scheme described in Nathan Chenette et al, "Practical Order-Revealing Encryption with Limited Leakage", FSE 2016 Revised Selected Papers of the 23rd International Conference on Fast Software Encryption—Volume 9783, Mar. 20, 2016, Pages 474-493, the ciphertext length increases in proportion to the total number of plaintexts. Accordingly, when the total number of plaintexts is increased, the processing amount for value comparison in encrypted data would be excessive.

In view of the above, one embodiment of the present invention is to achieve value comparison in encrypted data capable of executing on specific targets and to reduce the processing amount in the value comparison.

In order to solve the above problem, one embodiment of the present invention adopts the following configuration. A value comparison server includes a processor and a memory, wherein the memory holds a first secret key and a plurality of value comparison tags, each of the plurality of value comparison tags corresponds to each of a plurality of numerical values, each of the plurality of value comparison tags is a ciphertext obtained by encrypting each of the plurality of numerical values with an encryption scheme having an additive homomorphism by using a plurality of secret keys including the first secret key and by using a first parameter, a plaintext space has remainder operation with a natural number as modulo in the encryption scheme, and wherein the processor is configured to, in value comparison processing: generate a value used for comparing two numerical values corresponding to two value comparison tags included in the plurality of value comparison tags from the first secret key and the two value comparison tags by using the additive homomorphism; and determine which of the two numerical values corresponding to the two value comparison tags is greater or equal, on the basis of whether a discrete logarithm of the generated value to the first parameter can be calculated within a value of a predetermined range.

According to one embodiment of the present invention, it is possible to in view of the above, it is possible to achieve value comparison in encrypted data capable of executing on specific targets and to reduce the processing amount in the value comparison.

Problems, configurations, and effects other than in the above will become apparent by the following description in the embodiments as follows.

BRIEF DESCRIPTION OF THE DRAWINGS

FIG. 4 is a sequence diagram illustrating an example of encryption processing of encryption target data, transmission processing of encrypted data, and storage processing of ciphertext according to the first exemplary embodiment;

FIG. 8A is a diagram illustrating a list of system parameters and value comparison tag generation secret keys according to the first exemplary embodiment;

FIG. 8B is a diagram illustrating a list of system parameters and value comparison tag generation secret keys according to the first exemplary embodiment;

FIG. 8C is a diagram illustrating a list of system parameters and value comparison tag generation secret keys according to the first exemplary embodiment;

FIG. 11 is an example of a sort request screen according to the first exemplary embodiment; and FIG. 12 is a flowchart illustrating an example of threshold determination processing according to the first exemplary embodiment.

DESCRIPTION OF THE PREFERRED EMBODIMENTS

Figure 1:
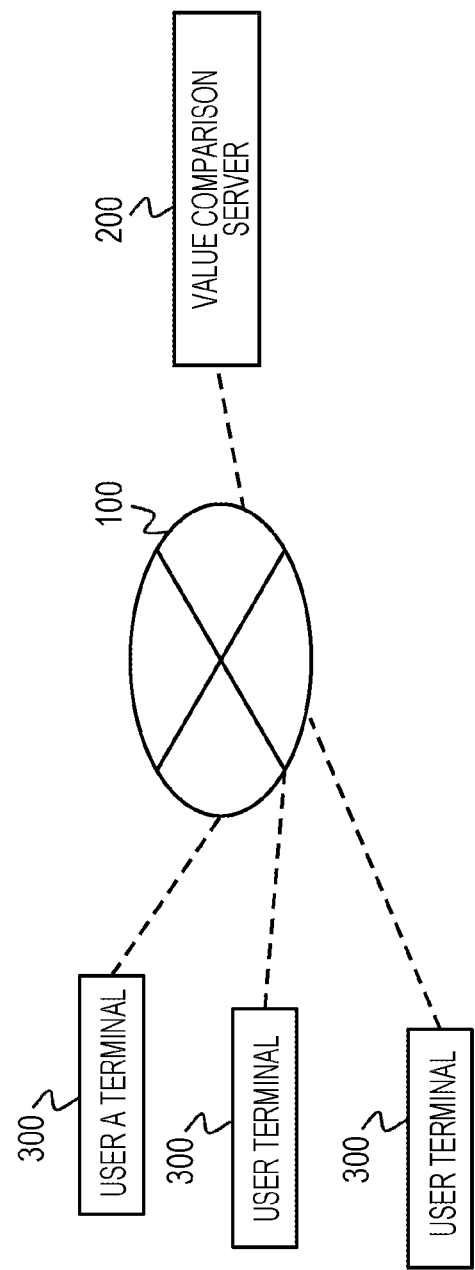
FIG. 1 is a block diagram illustrating a configuration example of a value comparable encryption system according to a first exemplary embodiment.

Hereinafter, embodiments of the present invention will be described with reference to the drawings. In the present embodiment, the same reference numerals are attached to the same configuration in principle, and duplicate description will be omitted. Note that the present embodiment is merely an example for implementing the present invention and is not intended to limit the technical scope of the present invention. Hereinafter, "value comparison" means determining greater-than or equal-to relation between values.

First Exemplary Embodiment (System Configuration)
FIG. 1 is a block diagram illustrating a configuration example of a value comparable encryption system. For example, the value comparable encryption system includes one or more user terminals 300 and a value comparison server 200. Each of the user terminals 300 and the value comparison server 200 are connected to each other via a network 100.

The user terminal 300 holds encryption target data including numerical values. The user terminal 300 first generates a value comparison tag to be described below for the numerical value, and thereafter encrypts the data. That is, the user terminal 300 is an example of an encryption terminal that executes encryption. The user terminal 300 transmits the encrypted data to the value comparison server 200.

On the basis of a request from the user terminal 300, the value comparison server 200 performs value comparison on the numerical values contained in the data in a state where the encrypted data is encrypted. The value comparison server 200 sorts the data on the basis of a result of the value comparison. The value comparison server 200 transmits the value comparison result or the sort result to the user terminal 300.

The value comparison server 200 is installed in a cloud provider, for example. A user using the service of the cloud provider owns the user terminal 300. An example of the user terminal 300 is a cellular phone.

Figure 2:
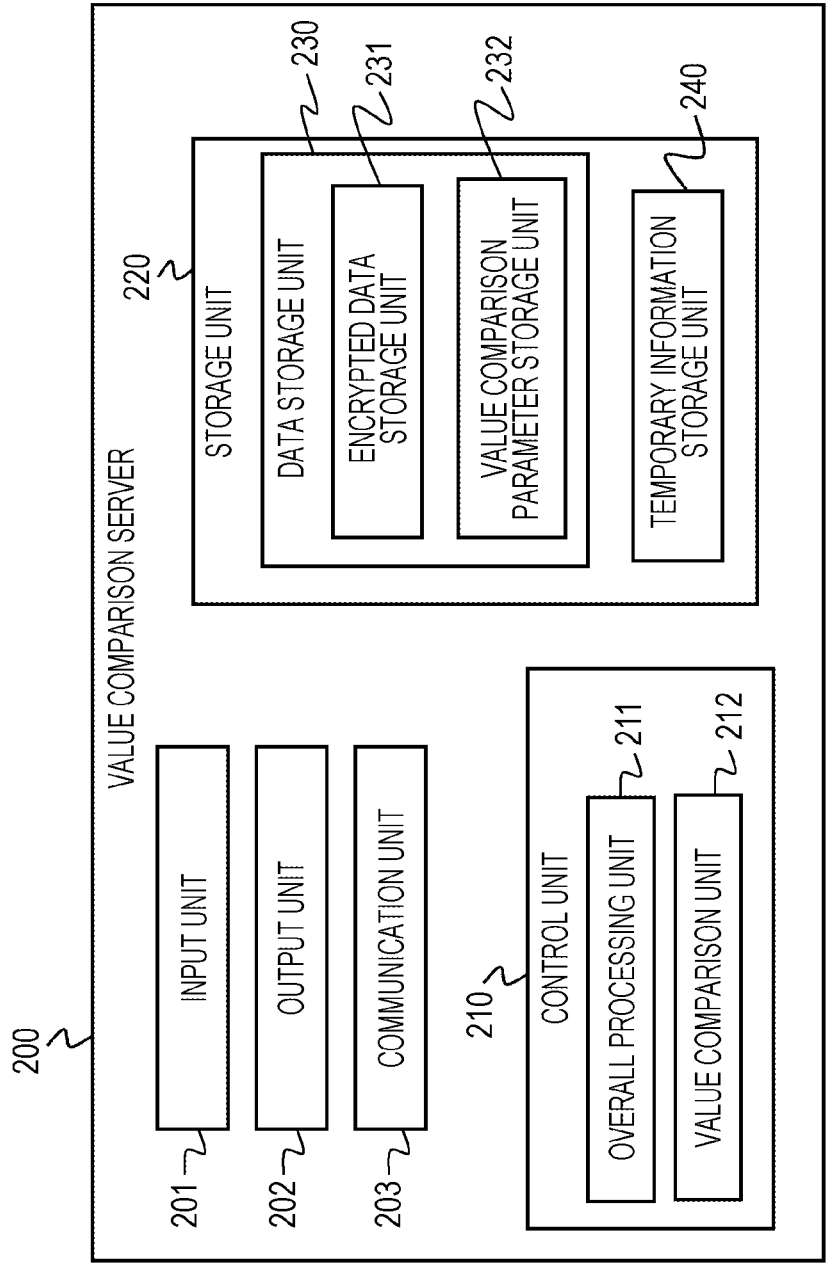
FIG. 2 is a block diagram illustrating a configuration example of a value comparison server according to the first exemplary embodiment.

(Value Comparison Server)
FIG. 2 is a block diagram illustrating a configuration example of the value comparison server 200. The value comparison server 200 is formed by a computer including a control unit 210, a storage unit 220, an input unit 201, an output unit 202, and a communication unit 203.

The control unit 210 includes a processor. The storage unit 220 includes a data storage unit 230 and a temporary information storage unit 240. The data storage unit 230 is formed by an auxiliary storage device, for example. The temporary information storage unit 240 is formed by a memory, for example.

The processor included in the control unit 210 executes a program stored in the memory. The memory includes a ROM being a nonvolatile storage device and a RAM being a volatile storage device. The ROM stores an invariable program (for example, BIOS) or the like. The RAM is a high-speed and volatile storage device such as a dynamic random access memory (DRAM), and temporarily stores a program executed by the processor and data used at the time of execution of the program.

The auxiliary storage device is a large capacity nonvolatile storage device such as a magnetic storage device (HDD), a flash memory (SSD), or the like, and stores a program executed by the processor and data used at the time of execution of the program. That is, the program is read from the auxiliary storage device, loaded to the memory, and executed by the processor.

The input unit 201 is, for example, a device such as a keyboard or a mouse that receives an input from an operator. The output unit 202 is a device that outputs an execution result of a program in a form visually recognizable by an operator, such as a display device or a printer. The value comparison server 200 includes an input interface and an output interface connected to the input unit 201 and the output unit 202.

The communication unit 203 is a network interface device that controls communication with another device in accordance with a predetermined protocol, for example. The communication unit 203 includes a serial interface such as USB, for example.

The program executed by the processor is supplied to the value comparison server 200 via a removable medium (CD-ROM, flash memory, etc.) or a network, and stored in a nonvolatile auxiliary storage device which is a non-transient storage medium. Therefore, the value comparison server 200 may include an interface for reading data from the removable medium.

The value comparison server 200 is a computer system that is physically configured on a single computer or on a plurality of logically or physically configured computers. The value comparison server 200 may operate on a separate thread on a same computer or may operate on a virtual computer built on a plurality of physical computer resources. The similar applies to the user terminal 300.

The control unit 210 includes an overall processing unit 211 and a value comparison unit 212. For example, the processor included in the control unit 210 operates in accordance with an overall processing program loaded in the memory, and thereby functions as the overall processing unit 211. The processor operates in accordance with a value comparison program loaded in the memory, thereby functioning as the value comparison unit 212. The similar applies to individual units included in the control unit of the user terminal 300 described below.

The overall processing unit 211 performs overall control of processing by the value comparison server 200. The overall processing unit 211 stores information received via the input unit 201 in the storage unit 220. The overall processing unit 211 controls transmission and reception of information with other devices including the user terminal 300.

Furthermore, the overall processing unit 211 outputs data to the output unit 202. The overall processing unit 211 reads the data stored in the storage unit 220 and transmits the data to the user terminal 300 via the communication unit 203. The overall processing unit 211 receives data from the user terminal 300 via the communication unit 203.

The data storage unit 230 of the storage unit 220 includes an encrypted data storage unit 231 and a value comparison parameter storage unit 232. The encrypted data storage unit 231 holds encrypted data received from the user terminal 300, for example. The value comparison parameter storage unit 232 holds parameters and keys for comparing values of the encrypted numerical value contained in the encrypted data.

Note that in the present exemplary embodiment and other exemplary embodiments, information used by the value comparable encryption system may be represented by any data structure, not limited to a certain data structure. For example, data structures appropriately selected from tables, lists, databases or queues can store information. Information used by the information storage system is stored in a corresponding data storage region in the data storage device.

(User Terminal)

Figure 3:
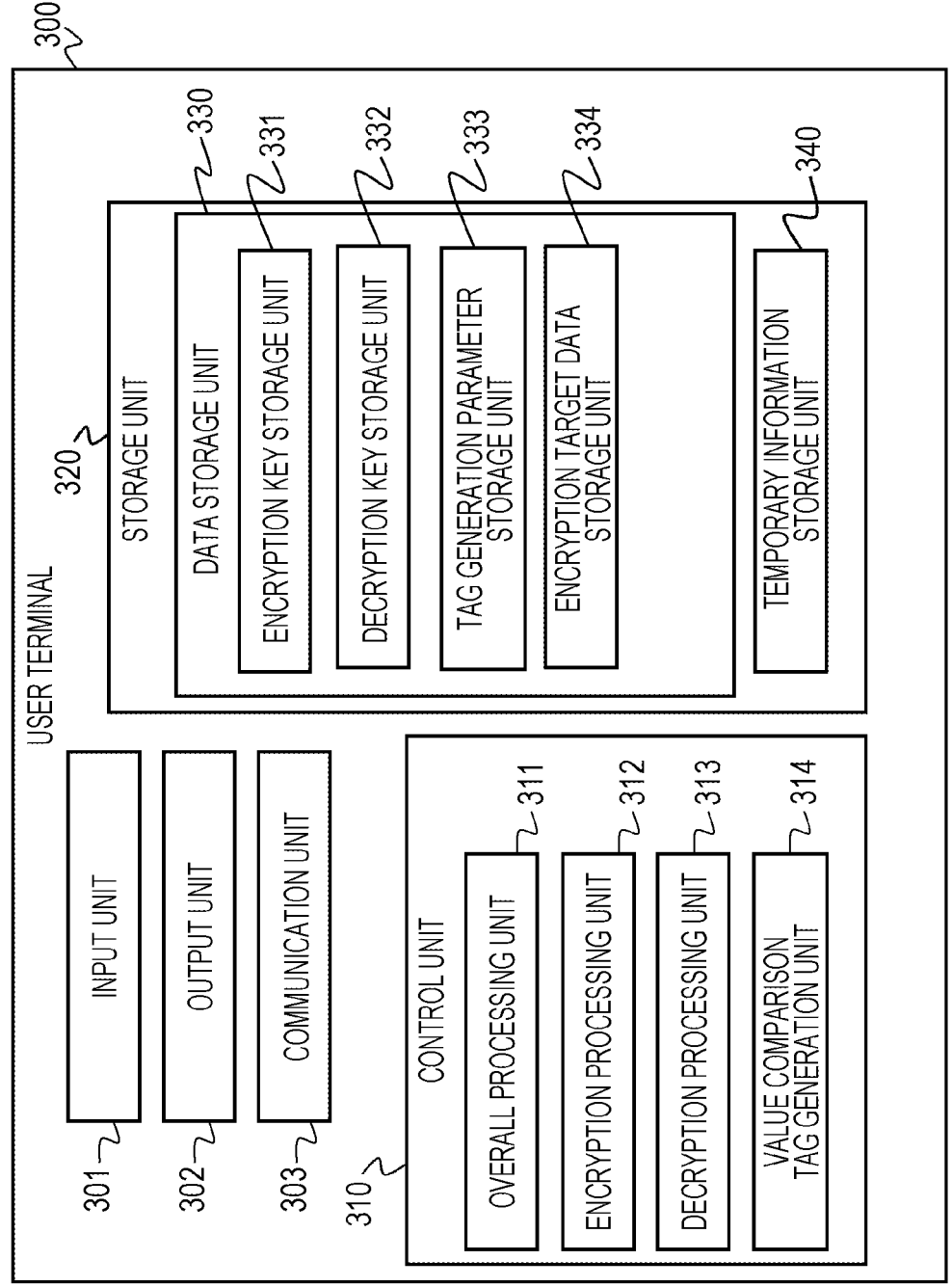
FIG. 3 is a block diagram illustrating a configuration example of a user terminal in the first exemplary embodiment.

FIG. 3 is a block diagram illustrating a configuration example of the user terminal 300. The user terminal 300 is formed by a computer including a control unit 310, a storage unit 320, an input unit 301, an output unit 302, and a communication unit 303. The storage unit 320 includes a data storage unit 330 and a temporary information storage unit 340.

Hardware constituting the control unit 310, the storage unit 320, the input unit 301, the output unit 302, the communication unit 303, the data storage unit 330, and the temporary information storage unit 340 is similar to the hardware constituting the control unit 210, the storage unit 220, the input unit 201, the output unit 202, the communication unit 203, the data storage unit 230, and the temporary information storage unit 240. Accordingly, description thereof will be omitted.

The control unit 310 includes an overall processing unit 311, an encryption processing unit 312, a decryption processing unit 313, and a value comparison tag generation unit 314. The overall processing unit 311 performs overall control of processing executed by the user terminal 300. The overall processing unit 311 stores the information received via the input unit 301, into the storage unit 320. The overall processing unit 311 controls transmission and reception of information with other devices including the value comparison server 200.

The overall processing unit 311 outputs the data to the output unit 302. The overall processing unit 311 reads the data stored in the storage unit 320, controls the encryption processing unit 312 to encrypt the data, controls the decryption processing unit 313 to decrypt the encrypted data, and transmits data to the value comparison server 200 via the communication unit 303. The overall processing unit 311 receives data from the value comparison server 200 via the communication unit 303.

The data storage unit 330 includes an encryption key storage unit 331, a decryption key storage unit 332, a tag generation parameter storage unit 333, and an encryption target data storage unit 334. The encryption key storage unit 331 holds a key for encrypting the encryption target data. The decryption key storage unit 332 holds a decryption key for decrypting the data encrypted with the encryption key. For example, the encryption key and the decryption key may be preliminarily stored in the encryption key storage unit 331 and the decryption key storage unit 332, respectively, or may be generated by the user terminal 300 itself, for example.

The tag generation parameter storage unit 333 holds an encryption key and a parameter for generating a value comparison tag. The encryption target data 334 holds encryption target data which is plaintext data to be encrypted.

<Processing by Value Comparable Encryption System>
(Encryption Processing and Ciphertext Storage Processing)

FIG. 4 is a sequence diagram illustrating an example of encryption processing of encryption target data, transmission processing of encrypted data, and storage processing of ciphertext. For convenience of explanation, an example of encrypted data formed in a table format will be described below. Hereinafter, it is assumed that the table of encryption target data includes columns including numerical cells having numerical values.

The value comparison tag generation unit 314 generates value comparison tags for the values of the individual numerical cells of the encryption target data held by the encryption target data storage unit 334 (S401). In step S401, the value comparison tag generation unit 314 uses an encryption scheme in which a plaintext space has remainder operation (for example, a partial additive group in which the plaintext space is a residue class group Z/nZ (Z is a group formed by whole integers, n is a natural number of 2 or more)), which is an encryption scheme having an additive homomorphism, and performs encryption of individual numerical cell values, thereby generating a value comparison tag. Although details will be described below, only those possessing a secret key can calculate a discrete logarithm of a predetermined system parameter of a value generated using a secret key and two value comparison tags, from values within a predetermined range.

Note that the value comparison tag generation unit 314 uses an encryption key held by the tag generation parameter storage unit 333 in execution of encryption in generating the value comparison tag. Details of the value comparison tag generation processing of step S403 will be described below.

Subsequently, the encryption processing unit 312 uses an encryption key held by the encryption key storage unit 331 and to encrypt individual cells included in the encryption target data and generates encrypted data (S402). In step S402, an arbitrary encryption scheme (for example, common key cryptography or public key cryptography) can be used. Note that the order of execution of step S401 and step S402 may be reversed.

Next, the value comparison tag generation unit 314 combines the values (ciphertext) of individual numerical cells in the encrypted data with the value comparison tags corresponding to the values of the numerical cells (S403). Subsequently, the overall processing unit 311 transmits the encrypted data combined with the value comparison tag, to the value comparison server 200 (S404). The overall processing unit 211 stores the received encrypted data in the encrypted data storage unit 231 (S405).

Figures 5A, 5B:
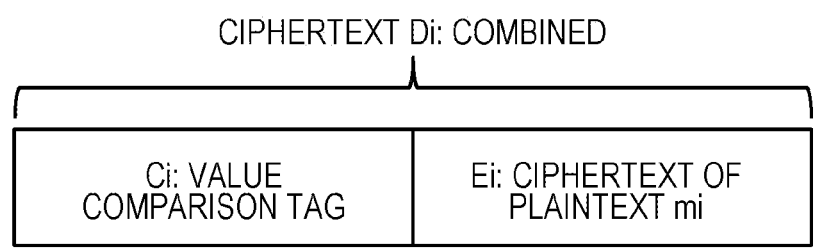
FIG. 5A is an example of a ciphertext combining a value comparison tag and an encrypted numerical cell value according to the first exemplary embodiment.
FIG. 5B is an example of encrypted data in the first exemplary embodiment.

FIG. 5A is an example of a ciphertext in which the value comparison tag and the value of the encrypted numerical cell are combined. In the example of FIG. 5A, a ciphertext Di is generated by combining a bit string of a ciphertext Ei encrypted from a plaintext mi to the immediate end of the bit string of a value comparison tag Ci. Note that, for example, predefining the total number of bits of the value comparison tag Ci would make it possible to discriminate between the bit corresponding to the value comparison tag Ci and the bit corresponding to the ciphertext Ei, among the ciphertext Di.

FIG. 5B is an example of encrypted data. In the example of FIG. 5B, age, having a numerical value, has been encrypted with the value comparable encryption according to the present embodiment. Di (i=1, 2, 3) is a ciphertext similar to the ciphertext in FIG. 5A. Ci||Ei represents a combination of bit sequences Ci and Ei. Enc 1 and Enc 2 represent arbitrary encryption schemes such as common key cryptography and public key cryptography, in which character type values having no importance in their sequence relation, such as addresses, have been encrypted.

In the example of FIG. 5B, different encryption schemes are used for the numeric type cells and the character type cells. Note that Enc 1 and Enc 2 may be encrypted with a same encryption scheme with a same key, or may be different schemes. In the example of FIG. 5B, the uppermost record indicating the item name and the leftmost column indicating identifiers of the records are not encrypted. However, these records and columns may also be encrypted.

(Value Comparison Processing and Sort Processing)

Figure 6:
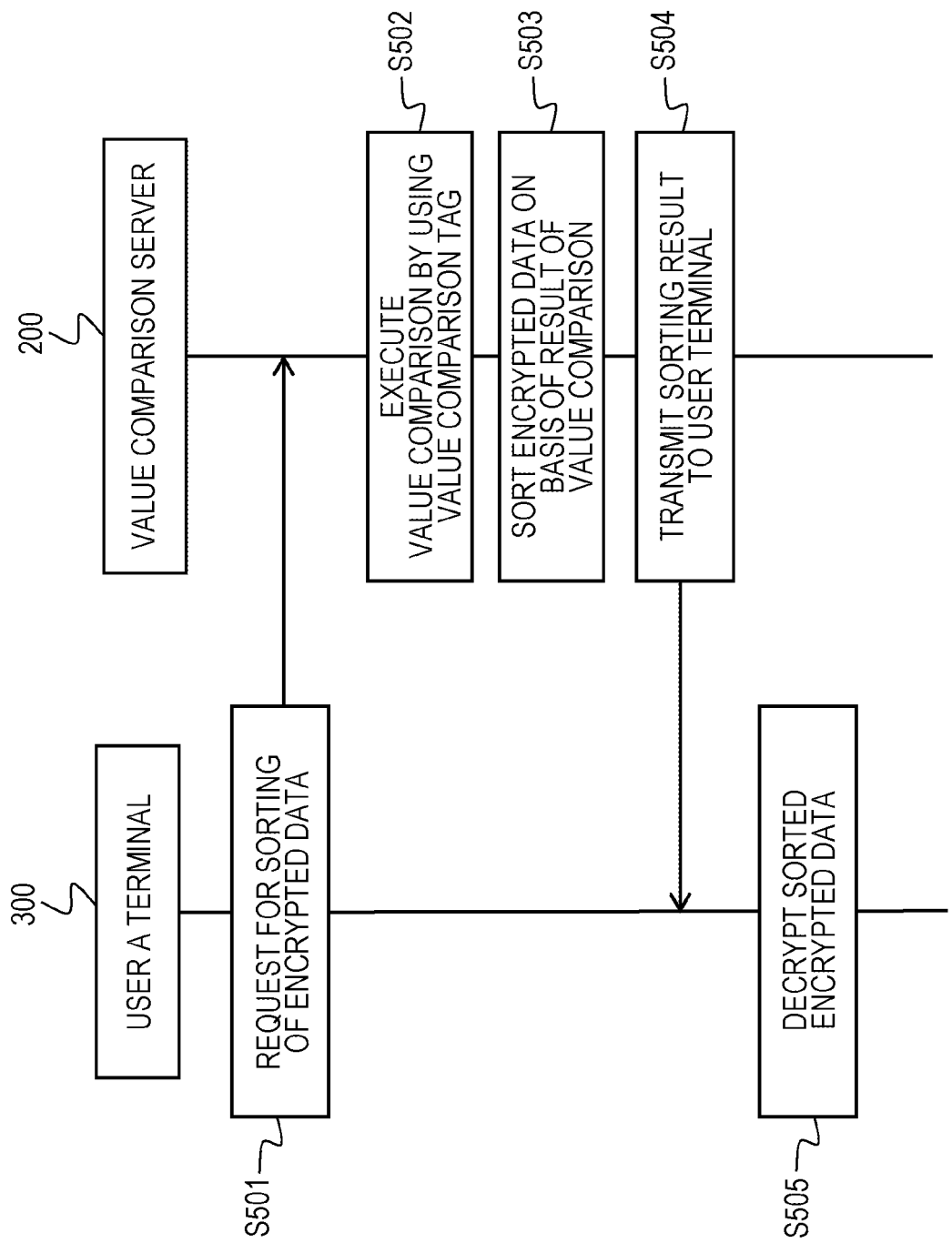
FIG. 6 is a sequence diagram illustrating an example of value comparison processing and sort processing according to the first exemplary embodiment.

FIG. 6 is a sequence diagram illustrating an example of value comparison processing and sort processing. The overall processing unit 211 requests value comparison processing and sorting processing of the encrypted data transmitted to the value comparison server 200, in accordance with an instruction input from the user, for example (S501). The overall processing unit 211 designates, in the request, sorting target encrypted data and a sorting target column as a numeric type cell in the encrypted data. Note that both rearranging the encrypted data in ascending order of the numerical cell values and sorting the data in descending order are examples of sort processing.

The value comparison unit 212 executes value comparison on the value of the designated numerical cell of the designated encrypted data (S502) using the value comparison tag. Details of the value comparison processing in step S502 will be described below.

Subsequently, the value comparison unit 212 sorts the encrypted data using the value comparison result (S503). The overall processing unit 211 transmits the encrypted data sorted by the value comparison unit 212 to the user terminal 300 without decryption (S504). The decryption processing unit 313 decrypts the ciphertext of the received encrypted data by using the decryption key held in the decryption key storage unit 332 (S505).

Note that FIG. 6 has described an example of executing sort processing, the user terminal 300 may designate a plurality of numerical cells of the encrypted data, and may request value comparison processing of the plurality of numerical cells alone to the value comparison server 200. In this case, the value comparison server 200 returns the value comparison result of the plurality of cells to the user terminal 300.

(Generating Value Comparison Tag)

Figure 7:
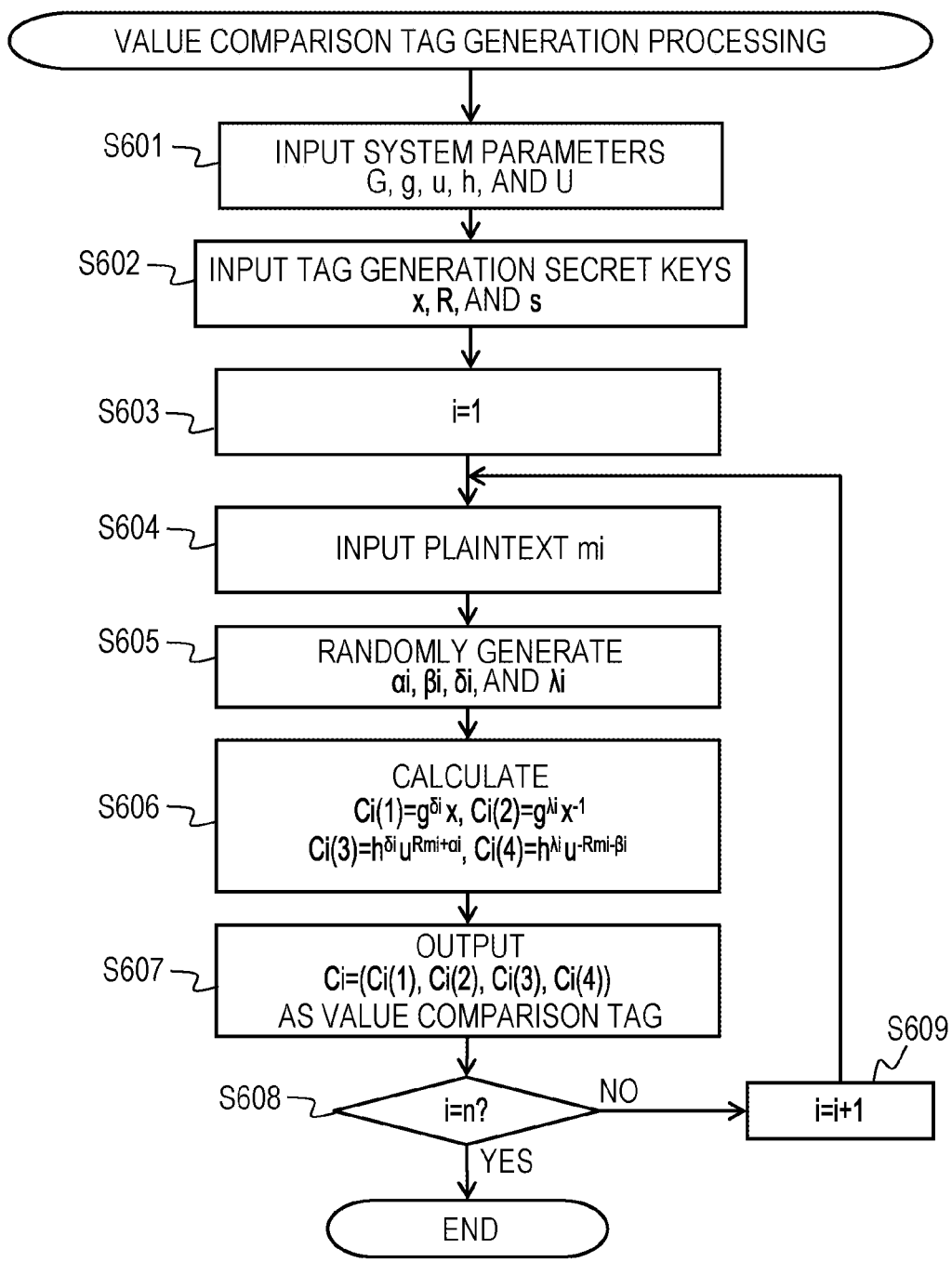
FIG. 7 is a flowchart illustrating an example of value comparison tag generation processing according to the first exemplary embodiment.

FIG. 7 is a flowchart illustrating an example of value comparison tag generation processing (S401). The user terminal 300 obtains system parameters G, g, u, h, and U by the starting time of the tag generation processing (S401). The value comparison server 200 obtains the same parameters by the time of start of the value comparison processing (S502).

Note that these system parameters may be preliminarily supplied from another device or user, or may be calculated by the value comparison tag generation unit 314. These system parameters are stored in the tag generation parameter storage unit 333 of the user terminal 300 and stored in the value comparison parameter storage unit 232 of the value comparison server 200. Note that the value comparison server 200 does not need to hold h among the system parameters.

Note that G is a finite cyclic group (for example, Z/pZ (p is a prime)) in which solving a discrete logarithm problem in G is computationally difficult. Being computationally difficult in solving a discrete logarithm problem in G indicates a state, for example, that in a case where a predetermined algorithm (for example, Baby-step Giant-step) is used, probability of solving a discrete logarithm problem in G by a predetermined number of calculations (for example, $2^{80}$ times) is a predetermined value (for example, ½ or less).

The system parameters g and u are randomly chosen different generators of G. h is defined by $h=g^s$. Note that s is a randomly generated integer larger than 1.

The system parameter U is a natural number, a value enabling solving a discrete logarithm problem in G with respect to a bottom u when a solution of the problem is an integer value of U or less. Specifically, for example, it would be desirable that the solution being an integer value of U or less enables solving a discrete logarithm problem with respect to a bottom u in G by a predetermined number of calculations in a case where a predetermined algorithm (for example, Baby-step Giant-step) is used. It is assumed that U is sufficiently smaller than the order of G (for example, at least one or more bits smaller) and sufficiently larger than any of the plaintexts of numerical cells (for example, at least one bit larger). The system parameter U is preliminarily given, for example.

Furthermore, in a case where an upper limit of the value of the plaintext numerical cell contained in the encryption target data is T, the value comparison tag generation unit 314 randomly generates a natural number R of 3 or more that satisfies RT<U. Note that T is smaller than the order of G.

By the time of start of the tag generation processing (S401), the user terminal 300 obtains value comparison tag generation secret keys x, R, and s and stores the obtained keys in the tag generation parameter storage unit 333. Note that these value comparison tag generation secret keys may be preliminarily supplied from another device or user, or may be calculated by the value comparison tag generation unit 314. Note that x is a randomly generated element of G.

In addition, the value comparison server 200 obtains a value comparison tag generation secret key s by the time of start of the value comparison processing (S502), and stores the obtained key s in the value comparison parameter storage unit 232. The value comparison tag generation secret key s is safely stored so as to be hidden from a third party not authorized to execute value comparison.

FIGS. 8A to 8C are diagrams illustrating a list of the above-described system parameters and the value comparison tag generation secret keys. In the example of FIG. 8, G is a cyclic group having an order of the prime p.

Returning to the description of FIG. 7. The overall processing unit 311 reads the system parameters G, g, u, h, and U from the tag generation parameter storage unit 333 and inputs the parameters to the value comparison tag generation unit 314 (S601). The overall processing unit 311 reads the value comparison tag generation secret keys x, R, and s from the tag generation parameter storage unit 333 and inputs the keys to the value comparison tag generation unit 314 (S602).

The overall processing unit 311 sets variable i to i=1 (S603). It is assumed that there are n plaintexts (m1, ..., mn) of numerical cells as targets for value comparison tag generation. For example, in a case where a value other than a nonnegative integer exists in m1, ..., mn, for example, it would be desirable that all of m1, ..., mn be multiplied by $10^k$ (k is a natural number) or same value be added to all of m1, ..., mn so as to m1, ..., mn have been converted to nonnegative integers.

The overall processing unit 311 inputs the plaintext mi of the (i-th) numerical cell as a sorting target to the value comparison tag generation unit 314 (S604). The value comparison tag generation unit 314 randomly generates integers αi and βi that satisfy 0<αi<R/2<βi<R and randomly generates positive integers δi and λi smaller than the order of G (S605).

Moreover, the value comparison tag generation unit 314 calculates $Ci(1)=g^{\delta i}x$, $Ci(2)=g^{\lambda i}x^{-1}$, $Ci(3)=h^{\delta i}u^{Rmi+\alpha i}$, $Ci(4)=h^{\lambda i}u^{Rmi-\beta i}$, being elements of G (S606).

The value comparison tag generation unit 314 outputs combinations of these, namely Ci=(Ci (1), Ci (2), Ci (3), Ci (4)), to the overall processing unit 311 as a value comparison tag for the plaintext mi (S607). The value comparison tag Ci is a ciphertext obtained from the plaintext mi using the secret keys x, R, and s.

The overall processing unit 311 determines whether i=n is satisfied (608). In a case where the overall processing unit 311 determines that i=n is not satisfied (S608: No), the overall processing unit 311 substitutes i+1 for i (S609) and returns to step S604. In a case where the overall processing unit 311 determines that i=n is satisfied (S608: Yes), the overall processing unit 311 completes the value comparison tag generation processing.

(Value Comparison Using Value Comparison Tag)

Figure 9:
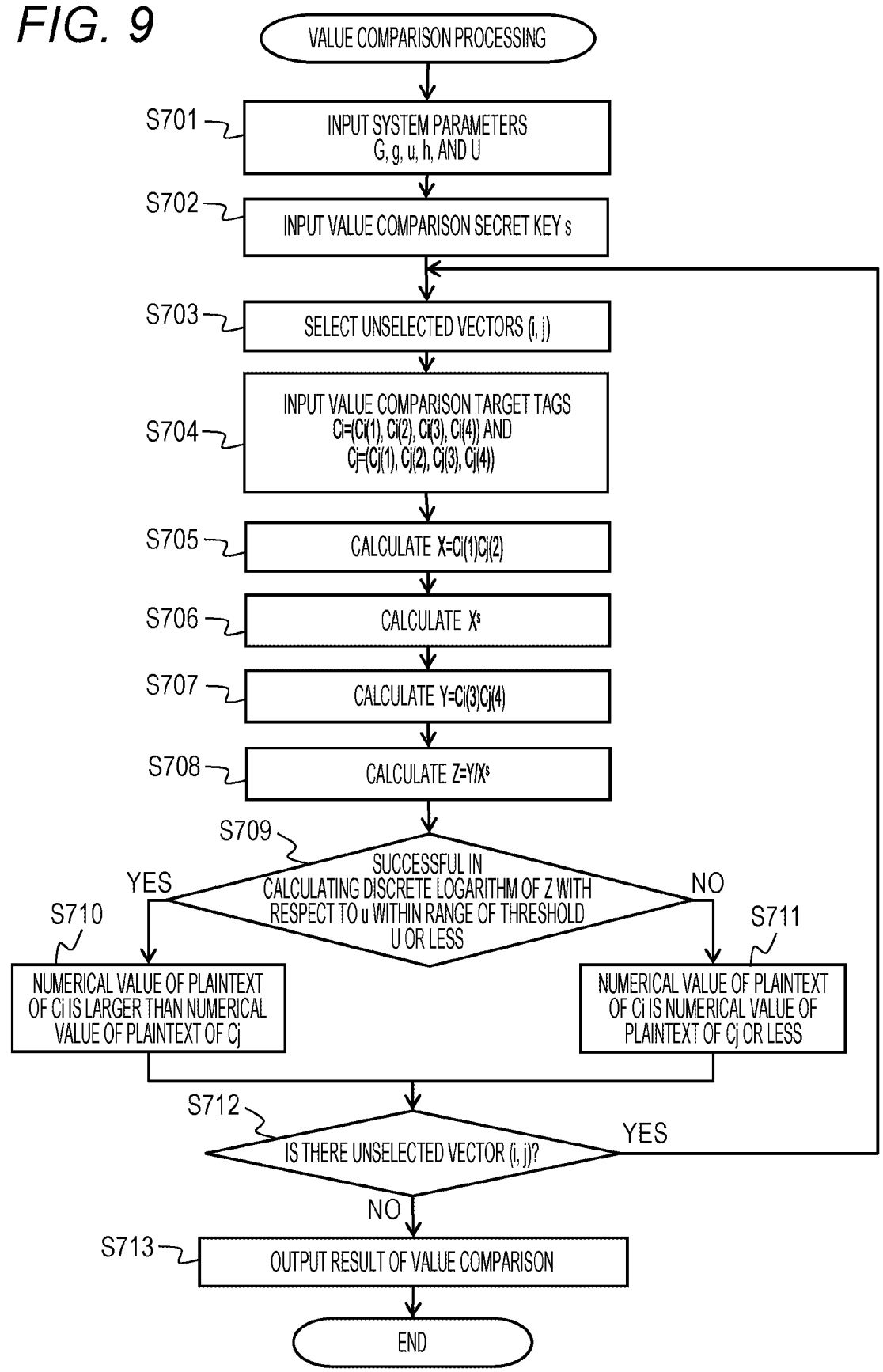
FIG. 9 is a flowchart illustrating an example of value comparison processing according to the first exemplary embodiment.

FIG. 9 is a flowchart illustrating an example of value comparison processing (S502). The overall processing unit 211 reads the system parameters G, g, u, h, and U from the value comparison parameter storage unit 232 and inputs the parameters to the value comparison unit 212 (S701). Note that the value comparison unit 212 need not read h of the system parameters. The overall processing unit 211 reads the value comparison secret key s from the value comparison parameter storage unit 232 and inputs the key to the value comparison unit 212 (S702).

Next, the overall processing unit 211 determines unselected vectors (i, j) having different natural numbers as elements (step S703). Here, i and j are individually assumed to be the number of tags as value comparison targets, or less. The overall processing unit 211 reads two tags Ci=(Ci (1), Ci (2), Ci (3), Ci (4)) and Cj=(Cj (1), Cj (2), Cj (3), Cj (4)) to be the target of value comparison from the encrypted data storage unit 231 and inputs the tags to the value comparison unit 212 (S704).

The value comparison unit 212 calculates $X=Ci(1)Cj(2) = g^{\delta i+\lambda j}$ using the additive homomorphism (S705). The value comparison unit 212 calculates $X^s=g^{s(\delta i+\lambda j)}=h^{\delta i+\lambda j}$ (S706). The value comparison unit 212 calculates $Y=Ci(3)Cj(4) = h^{\delta i+\lambda j}u^{R(mi-mj)+(\alpha i-\beta j)}$ (S707) using additive homomorphism and a calculation result of step S706. The value comparison unit 212 calculates $Z=Y/X^s=u^{R(mi-mj)+(\alpha i-\beta j)}$ (S708).

Next, the value comparison unit 212 attempts calculation of a discrete logarithm of Z with respect to u within a range of a threshold U or less (S709). Note that calculation of the discrete logarithm in step S709 uses a method such as a Baby step Giant step, for example. In a case where the discrete logarithm can be calculated (S709: Yes), the value comparison unit 212 determines that the numerical value of plaintext Ci is larger than the numerical value of plaintext Cj, and then notifies the determination result to the overall processing unit 211 (S710). In a case where the discrete logarithm can be calculated (S709: No), the value comparison unit 212 determines that the numerical value of plaintext of Ci is the numerical value of the plaintext of Cj or less, and then notifies the determination result to the overall processing unit 211 (S711).

The relation between the capability of calculating the discrete logarithm in step S709 and the result of the value comparison will be described in detail. In a case where the discrete logarithm of Z with respect to u cannot be calculated within a range of U or less, the plaintext mi and mj satisfy R (mi−mj)+(αi−βj)<0 or U<R (mi−mj)+(αi−βj)<(order of group G).

Meanwhile, the relationship RT<U is satisfied with respect to an upper limit T of the value of the numerical cell. Since 0<αi<R/2<βj<R is satisfied, R (mi−mj)+(αi−βj) <RT<U would be established. Accordingly, the inequality R (mi−mj)+(αi−βj)<0 holds. When mi mj holds, the inequality would be apparently satisfied. Assuming that mi>mj, the result can be 0>R (mi−mj)+(αi−βj)>R×1+(0−R)=0, which is contradictory. Accordingly, in a case where the discrete logarithm of Z with respect to u cannot be calculated within the range of U or less, then mi≤mj holds.

As opposed to this, in a case where the discrete logarithm of Z with respect to u of Z can be calculated within the range of U or less, the plaintext mi, mj satisfies the inequality 0≤R (mi−mj)+(αi−βj)≤U. If mi≤mj, since the inequality apparently contradicts, at least mi>mj hold. Moreover, in a case where mi>mj is satisfied, the relation would be 1≤mi−mj≤T.

At this time, relations would be Min{R(mi−mj)+(αi−βj)}>R×1+(0−R)=0 and Max{R(mi−mj)+(αi−βj)}<RT+(αi−βj)<U+(αi−βj), in which R(mi−mj)+(αi−βj) is a monotonically increasing function of (mi−mj). Accordingly, all mi and mj satisfying mi>mj would satisfy the above inequality. Accordingly, in a case where the discrete logarithm of Z with respect to u can be calculated within the range of U or less, then, mi>mj holds.

The overall processing unit 211 determines whether there is an unselected vector (i, j) (S712). In a case where it is determined that there is an unselected (i, j) (S712: Yes), the overall processing unit 211 returns to step S703. In a case where it is determined that there is no unselected (i, j) (S712: No), the overall processing unit 211 returns all the value comparison results to the value comparison unit 212, finishes the value comparison processing, and proceeds to step S503.

Note that in cases where the setting for the plaintext mk, and ml is (i, j)=(k, 1) or (i, j)=(1, k), mk=ml would be established in a case where discrete logarithm of step S709 (that is, discrete logarithm of U or less) cannot be calculated. In addition, in a case where the discrete logarithm in step S709 cannot be calculated with the setting of (i, j)=(k, 1) and in a case where the discrete logarithm in step S709 can be calculated with the setting (i, j)=(1, k), for the plaintext mk and ml, the relationship would be mk<ml.

Note that even in a case where it is determined that there is an unselected vector (i, j) in step S712, the overall processing unit 211 may proceed to step S712 without returning to step S703 in a case where greater-than relationship between mi and mj corresponding to each of all the unselected vectors can be determined from the already output determination result.

Specifically, in a case where determination results of m1<m2 and m2<m3 have already been obtained, for example, the overall processing unit 211 may determine that m1<m3 even when (i, j)=(1, 3) and (i, j)=(3, 1) are unselected.

Note that in a case where it is sufficient to be able to simply determine whether mi>mj or mi≤mj is satisfied in value comparison processing of the plaintext mi and mj (that is, there is no need to determine whether mi=mj or mi<mj is satisfied), it would be sufficient to replace the vectors (i, j) having different natural numbers as elements in steps S703 and S712 with (i, j) having different combination of natural numbers.

As described above, the value comparison tags are generated using the group G. The group G may be a group that is considered to be difficult to calculate a solution of the discrete logarithm problem, such as a multiplicative group of finite field or a group formed by rational points of an elliptic curve on a finite field, and would not be limited to the above described group.

Figure 10:
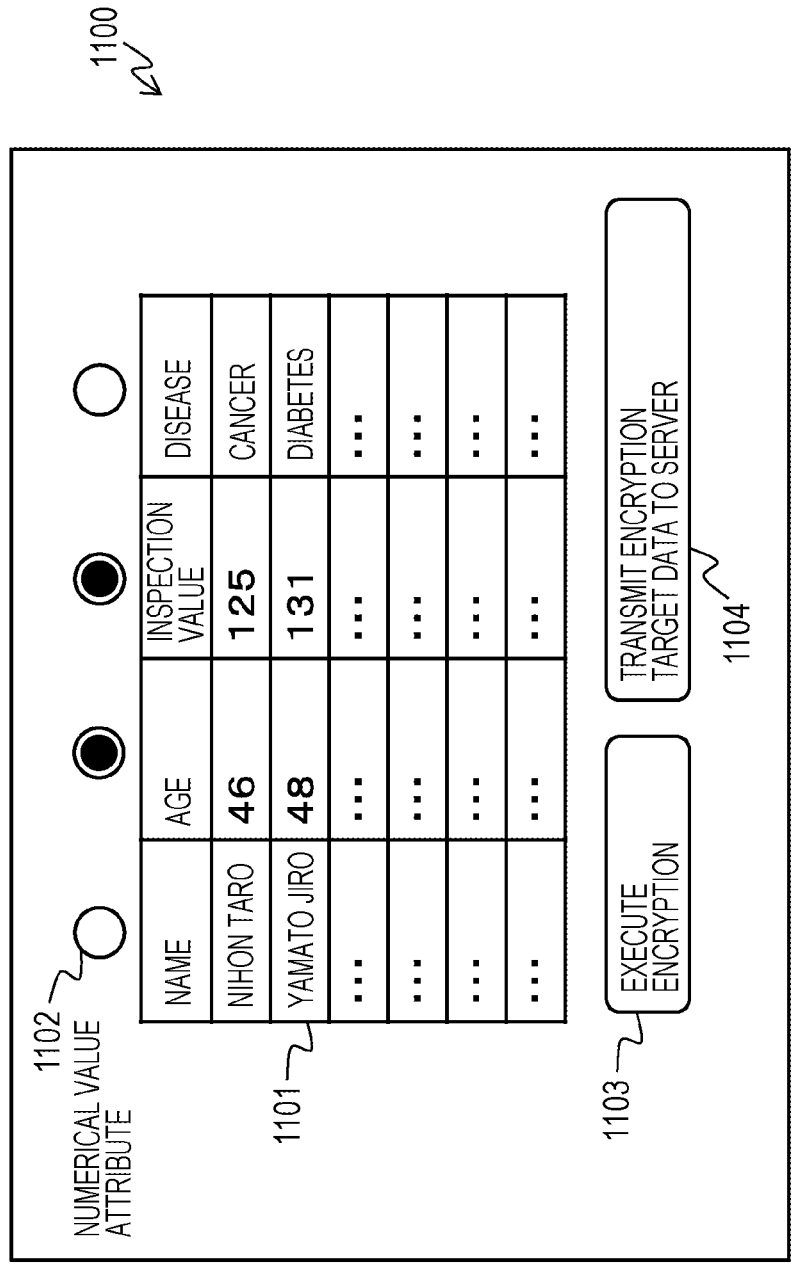
FIG. 10 is an example of an encryption execution screen according to the first exemplary embodiment.

FIG. 10 is an example of an operation screen displayed on the user terminal 300. Specifically, FIG. 10 is an example of an encryption execution screen 1100. The encryption execution screen 1100 includes a data display region 1101, a radio button 1102, an encryption execution button 1103, and a server transmission button 1104. The data display region 1101 display a part or all of encryption target data.

The radio button 1102 is a radio button for selecting a column in the form of numerical type cells to be encrypted by the value comparable encryption of the present exemplary embodiment. The encryption execution button 1103 is a selection button for executing encryption of encryption target data after selection of a numerical type column using the radio button 1102. As described above, for example, a column selected as a numeric type is encrypted with value comparison determinable encryption in the present exemplary embodiment, and the other columns are encrypted by a normal encryption scheme.

After the encryption is completed, the encrypted data may be displayed in the data display region 1101. The server transmission button 1104 is a selection button for transmitting the data to the value comparison server 200 after the encryption target data is encrypted.

FIG. 11 is an example of an operation screen displayed on the user terminal 300. Specifically, FIG. 11 is an example of a sort request screen 1200 for requesting sorting of the encrypted data transmitted to the value comparison server 200. The sort request screen 1200 includes a radio button 1201, a sort request button 1202, a data display region 1203, a decryption execution button 1204, and a decryption result store button 1205.

The radio button 1201 is a radio button for selecting a sorting target column. The sort request button 1202 is a selection button for requesting the value comparison server 200 to sort the encrypted data using the sorting target column as a key.

As described above, the value comparison server 200 sorts the encrypted data in a state where the data is encrypted in accordance with the sort request, and transmits the sorted encrypted data to the user terminal 300. The data display region 1203 displays the sorted encrypted data received from the value comparison server 200.

The decryption execution button 1204 is a selection button for decrypting the sorted encrypted data. The decryption result, that is, sorted plaintext may be displayed in the data display region 1203. The decryption result store button 1205 is a selection button for storing the decryption result in the storage unit 220. The operation screens of FIGS. 10 and 11 are merely examples, and the screen configuration, the operation order of selection buttons, the screen transition, or the like are not limited to this example.

Summary of First Exemplary Embodiment

In the data value comparable encryption system of the present exemplary embodiment, the user terminal 300 transmits encrypted data including numerical cells to the value comparison server 200. The value comparison server 200 further executes the value comparison of the numerical value while keeping the encrypted data encrypted. Furthermore, the value comparison server 200 executes sorting using the value comparison result.

The value comparison server 200 transmits the result of value comparison or sorted encrypted data to the user terminal 300. The user terminal 300 decrypts the sorted encrypted data received from the value comparison server 200.

Note that the value comparison server 200 executes value comparison using a value comparison secret key, and thus, the person without the secret key cannot perform value comparison. Therefore, even when the ciphertext is leaked, value comparison would not to be performed by a third party unless leakage of the value comparison secret key has occurred, and thus, information leakage can be minimized. Moreover, it is not possible to decrypt encrypted data using the value comparison secret key alone.

Furthermore, according to the present exemplary embodiment, the length of the value comparison tag depends on the maximum bit length of the plaintext, but not proportional to the total number of plaintexts for generating value comparison tags. This makes it possible to suppress the length of the value comparison tag.

Note that the encryption scheme used for generating the value comparison tag may be another encryption scheme. However, in the other encryption scheme, the plaintext space has remainder operation, and the other encryption scheme has additive homomorphism. Furthermore, in the other encryption scheme, only the person possessing a secret key can calculate a discrete logarithm of a predetermined system parameter of a value generated using a secret key and two value comparison tags.

Second Exemplary Embodiment

The value comparable determinable encryption system of the present exemplary embodiment can further execute threshold determination processing. FIG. 12 is a flowchart illustrating an example of threshold determination processing. It is assumed that the processing of FIG. 4 has already been completed. That is, the encrypted data encrypted by the encryption scheme of the first exemplary embodiment is held in the value comparison server 200. It is also assumed that the overall processing unit 311 has obtained a threshold m for threshold determination target and outputs the threshold m to the value comparison tag generation unit 314. The threshold m is designated by the user via the input unit 201, for example.

In step S1001, the value comparison tag generation unit 314 performs processing similar to that in FIG. 7 for the threshold m and generates a value comparison tag D. The overall processing unit 311 generates a threshold determination request including the value comparison tag D and transmits the request to the value comparison server 200 (S1002). The threshold determination request includes a request to cause the value comparison server 200 to extract and return the numerical cells including the designated column of the encrypted data and larger than the threshold m, which is the value corresponding to the value comparison tag D. Note that the column is designated by the user via the input unit 201, for example.

The value comparison unit 212 uses the value comparison tag D and the encrypted value comparison tag and performs value comparison processing on the threshold m and the value of each of the numerical cells of the encrypted data (S10003). The value comparison processing is similar to the processing of FIG. 9.

The overall processing unit 311 selects a numerical cell determined to be larger than the threshold m in the value comparison processing (S1004), and transmits the numerical cell or a record including the numerical cell to the user terminal 300 in an encrypted state (S1005).

The decryption processing unit 313 uses a decryption key stored in the decryption key storage unit 332 and decrypts a ciphertext portion of the encrypted data received from the value comparison server 200 (S1006).

Note that while FIG. 12 is an example in which the value comparison server 200 searches for a numerical value larger than the threshold m, it is also allowable to configure such that a numerical value smaller than the threshold m be searched, or a numerical value included between the two thresholds be searched (range search).

The present invention is not limited to the above-described exemplary embodiments, but may include various types of modification. For example, the above-described exemplary embodiments give detailed explanation just to allow the present invention to be clearly understood. Therefore, the present invention is not limited to the case having all of components in the configuration. In addition, a portion of configuration of an exemplary embodiment can be replaced with a portion of configuration of another exemplary embodiment. A portion or the configuration of another exemplary embodiment can be added to a certain exemplary embodiment. Moreover, regarding the portions of the configuration of each of the exemplary embodiments, addition, deletion, and replacement from another configuration would be possible.

Moreover, the above configurations, functions, processing units, processing means, or the like, may be implemented by hardware by designing a portion or all with an integrated circuit, for example. Moreover, each of the above-described configurations, functions, or the like, may be implemented with software by a processor by interpreting and executing a program designed to realize individual functions. Information such as programs, tables, files used to implement each of functions can be located in a recording device such as memory, a hard disk, a solid state drive (SSD), or a recording medium such as an IC card, SD card, and DVD.

Note that control lines and information lines are illustrated to represent what is considered to be necessary for description, and thus, not necessarily represent all control lines and information lines involved with the product. In practice, substantially all of the configurations may be considered to be connected to each other.

What is claimed is:

1. A value comparison server for reducing processing amounts, the value comparison server comprising:
   a processor and a memory,
   wherein the memory holds a first secret key and a plurality of value comparison tags,
   each of the plurality of value comparison tags corresponds to each of a plurality of numerical values,
   each of the plurality of value comparison tags is a ciphertext obtained by encrypting each of the plurality of numerical values with an encryption scheme having an additive homomorphism by using a plurality of secret keys including the first secret key and by using a first parameter, a plaintext space includes a remainder operation with a natural number as modulo in the encryption scheme, and wherein the processor is configured to, in value comparison processing:

generate a value used for comparing two numerical values corresponding to two value comparison tags included in the plurality of value comparison tags from the first secret key and the two value comparison tags by using the additive homomorphism including the plaintext space; and determine which of the two numerical values corresponding to the two value comparison tags is greater, on the basis of whether a discrete logarithm of the generated value to the first parameter can be calculated within a value of a predetermined range.

2. The value comparison server according to claim 1, wherein the memory holds each of the plurality of numerical values encrypted by an encryption scheme that cannot be decrypted by the plurality of secret keys, in association with the value comparison tag, and wherein the processor is configured to:

execute the value comparison processing for each of combinations of value comparison tags included in the plurality of value comparison tags: and sort the plurality of encrypted numerical values on the basis of a result of the value comparison processing.

3. The value comparison server according to claim 1, wherein the memory holds a value comparison tag corresponding to a threshold, wherein the value comparison tag corresponding to the threshold is individually a ciphertext obtained by encrypting the threshold by the encryption scheme using the plurality of secret key and the first parameter, wherein the memory holds an encrypted numerical value obtained by encrypting each of the plurality of numerical values with a secret key different from the first secret key, in association with the value comparison tag, and wherein the processor is configured to:

execute the value comparison processing for the value comparison tag corresponding to the threshold and each of the plurality of value comparison tags: and execute threshold processing for the threshold of the encrypted numerical value on the basis of a result of the value comparison processing.

4. The value comparison server according to claim 1, wherein, with respect to a certain natural number i being the number of the value comparison tags, an i-th value comparison tag $C_i$ included in the plurality of value comparison tags is expressed by $C_i = (C_i(1), C_i(2), C_i(3), C_i(4))$, a relationship of $C_i(1) = g^{\delta_i} x$, $C_i(2) = g^{\lambda_i} x^{-1}$, $C_i(3) = h^{\delta_i} u^{R m_i + \alpha_i}$, $C_i(4) = h^{\delta_i} u^{-R m_i - \beta_i}$ is satisfied, where g and u are different generators of G being a finite cyclic group, u is the first parameter, x is an element of G, probability of solving a discrete logarithm problem in G with a predetermined number of calculations using a predetermined algorithm is a predetermined value or less, h has a relationship of $h = g^S$ with respect to s being the first secret key, $\delta_i$ and $\lambda_i$ are positive integers less than an order of G, $\alpha_i$ and $\beta_i$ are integers satisfying $0 < \alpha_i < R/2 < \beta_i < R$ with respect to a natural number R being 3 or more satisfying $RT < U$, T is an upper limit of the plurality of numerical values, and U is a value defined such that a discrete logarithm problem in G to u can be solved using a predetermined algorithm and with a predetermined number of calculations in a case where a solution of the discrete logarithm problem is within a range of U or less.

5. The value comparison server according to claim 4, wherein the memory is configured to hold information identifying G, g, u, and U, and wherein the processor is configured to:

calculate, by using the additive homomorphism, $X = C_i(1) C_j(2) = g^{\delta_i + \lambda_j}$ and $Y = C_i(3) C_j(4) = h^{\delta_i + \lambda_j} u^{R(m_i - m_j) + (\alpha_i - \delta_j)}$ where $C_i = (C_i(1), C_i(2), C_i(3), C_i(4))$ and $C_j = (C_j(1), C_j(2), C_j(3), C_j(4))$ are the two value comparison tags:

calculates $X^s = g^{s(\delta_i + \lambda_j)} = h^{\delta_i + \lambda_j}$;

calculate $Z = Y/X^S = u^{R(m_i - m_j) + (\alpha_i - \beta_j)}$ as the value used for comparing:

determine that a numerical value corresponding to $C_i$ is larger than a numerical value corresponding to $C_j$ in a case where the processor has determined that the discrete logarithm of Z to u can be calculated within a range of U or less: and determine that a numerical value corresponding to $C_i$ is a numerical value corresponding to $C_j$ or less in a case where the processor has determined that the discrete logarithm of Z to u cannot be calculated within a range of U or less.

6. A value comparison encryption system server for reducing processing amounts, the value comparison encryption system server comprising an encryption terminal and a value comparison server, wherein the encryption terminal is configured to:

hold a plurality of numerical values, a plurality of secret keys including a first secret key, and a first parameter: and generates a plurality of value comparison tags corresponding to the plurality of numerical values, by encrypting each of the plurality of numerical values with an encryption scheme having an additive homomorphism by using a plurality of secret keys including the first secret key and by using a first parameter, a plaintext space includes a remainder operation with a natural number as modulo in the encryption scheme, wherein the encryption terminal is configured to transmit the plurality of value comparison tags to the value comparison server, and wherein the value comparison server is configured to:

hold the first secret key: and, in value comparison, generate a value used for comparing two numerical values corresponding to two value comparison tags included in the plurality of value comparison tags from the first secret key and the two value comparison tags by using the additive homomorphism including the plaintext space; and determine which of the two numerical values corresponding to the two value comparison tags is greater,

17 on the basis of whether a discrete logarithm of the generated value to the first parameter can be calculated within a value of a predetermined range.

7. The value comparison encryption system according to claim 6,
wherein the encryption terminal is configured to:
generate a plurality of encrypted numerical value obtained by encrypting each of the plurality of numerical values using a secret key different from the first secret key:
transmit, to the value comparison server, each of the plurality of encrypted numerical values and each of the plurality of value comparison tags in association with each other, and
wherein the value comparison server is configured to:
execute the value comparison processing for each of combinations of value comparison tags included in the plurality of value comparison tags:
sort the plurality of encrypted numerical values on the basis of a result of the value comparison processing: and
transmit the sorted plurality of encrypted numerical values to the encryption terminal.

8. The value comparison encryption system according to claim 6,
wherein the encryption terminal is configured to:
generate a value comparison tag corresponding to the threshold by encrypting a threshold using the plurality of secret key and the first parameter in the encryption scheme:
transmit the value comparison tag corresponding to the threshold to the value comparison server:
generate an encrypted numerical value obtained by encrypting each of the plurality of numerical values using a secret key different from the first secret key: and
transmit, to the value comparison server, each of the encrypted numerical values and each of the plurality of value comparison tags in association with each other, and
wherein the value comparison server is configured to:
execute the value comparison processing for the value comparison tag corresponding to the threshold and each of the plurality of value comparison tags: and
execute threshold processing for the threshold of the encrypted numerical value on the basis of a result of the value comparison processing.

9. The value comparison encryption system according to claim 6,
wherein the encryption terminal is configured to: select selects g and u being different generators of G being a finite cyclic group:
select x being an element of G:
calculate $h=g^s$ for s as the first secret key:
selects $\delta i$ and $\lambda i$ being positive integers less than an order of G: and
select integers $\alpha i$ and $\beta i$ satisfying $0<\alpha i<R/2<\beta i<R$ with respect to a natural number R of 3 or more satisfying RT<U:
u is the first parameter,
probability of solving a discrete logarithm problem in G with a predetermined number of calculations using a predetermined algorithm is a predetermined value or less,
T is an upper limit of the plurality of numerical values,
U is a value defined such that a discrete logarithm problem in G with respect to u can be solved using a predetermined algorithm and with a predetermined

18 number of calculations in a case where a solution of the discrete logarithm problem is within a range of U or less, and
wherein the encryption terminal is configured to calculate a value comparison tag $Ci=(Ci(1), Ci(2), Ci(3), Ci(4))$ corresponding to the i-th numerical value with respect to a natural number i being less than equaling to a number of the plurality of numerical values, where $Ci(1)=g^{\delta i}x$, $Ci(2)=g^{\lambda_i}x^{-1}$, $Ci(3)=h^{\delta i}u^{Rmi+\alpha i}$, $Ci(4)=h^{\alpha i}u^{-Rmi-\beta i}$ is satisfied.

10. The value comparison encryption system according to claim 9,
wherein the value comparison server is configured to:
hold information identifying G, g, u, and U:
calculate, by using the additive homomorphism, $X=Ci(1)Cj(2)=g^{\delta i+\alpha j}$ and $Y=Ci(3)Cj(4)=h^{\delta i+\lambda j}u^{R(mi-mj)+(\alpha i-\beta j)}$ where $Ci=(Ci(1), Ci(2), Ci(3), Ci(4))$ and $Cj=(Cj(1), Cj(2), Cj(3), Cj(4))$ are the two value comparison tags:
calculates $X^s=g^{s(\delta i+\alpha j)}=h^{\delta i+\lambda j}$,
calculate $Z=Y/X^S=u^{R(mi-mj)+(\alpha i-\beta j)}$ as the value used for comparing:
determine that a numerical value corresponding to Ci is larger than a numerical value corresponding to Cj in a case where the processor has determined that the discrete logarithm of Z to u can be calculated within a range of U or less: and
determine that a numerical value corresponding to Ci is a numerical value corresponding to Cj or less in a case where the processor has determined that the discrete logarithm of Z to u cannot be calculated within a range of U or less.

11. A value comparison method implemented by a value comparison server for reducing processing amounts, comprising
wherein the value comparison server includes a processor and a memory,
wherein the memory holds a first secret key and a plurality of value comparison tags,
each of the plurality of value comparison tags corresponds to each of a plurality of numerical values,
each of the plurality of value comparison tags is a ciphertext obtained by encrypting each of the plurality of numerical values with an encryption scheme having an additive homomorphism by using a plurality of secret keys including the first secret key and by using a first parameter,
a plaintext space includes a remainder operation with a natural number as modulo in the encryption scheme, and
the value comparison method comprising, in value comparison processing by the processor:
generating, by the processor, a value used for comparing two numerical values corresponding to two value comparison tags included in the plurality of value comparison tags from the first secret key and the two value comparison tags by using the additive homomorphism including the plaintext space; and
determining, by the processor, which of the two numerical values corresponding to the two value comparison tags is greater, on the basis of whether a discrete logarithm of the generated value to the first parameter can be calculated within a value of a predetermined range.

* * * * *